United States Patent
Wu (10) Patent No.: US 10,073,748 B2
(45) Date of Patent: Sep. 11, 2018

(54) FAILOVER SYSTEM AND METHOD OF DECIDING MASTER-SLAVE RELATIONSHIP THEREFOR

(71) Applicant: Wistron Corporation, New Taipei (TW)

(72) Inventor: Yi-Chang Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 93 days.

(21) Appl. No.: 14/631,862

(22) Filed: Feb. 26, 2015

(65) Prior Publication Data

US 2016/0132407 A1    May 12, 2016

(30) Foreign Application Priority Data

Nov. 12, 2014    (TW) .............................. 103139206 A (51) Int. Cl.
*G06F 11/20* (2006.01)

(52) U.S. Cl.
CPC ...... *G06F 11/2028* (2013.01); *G06F 11/2023* (2013.01); *G06F 11/2025* (2013.01); *G06F 11/2033* (2013.01); *G06F 11/2041* (2013.01)

(58) Field of Classification Search
CPC ......................... G06F 11/2033; G06F 11/2023
See application file for complete search history.

(56) References Cited

U.S. PATENT DOCUMENTS

| | | | | |
|---|---|---|---|---|
| 5,631,629 A | * | 5/1997 | Fooks | G08B 25/04 340/500 |
| 6,035,415 A | * | 3/2000 | Fleming | G06F 11/2023 714/11 |
| 2002/0004912 A1 | * | 1/2002 | Fung | G06F 1/3203 713/300 |
| 2003/0188222 A1 | * | 10/2003 | Abbondanzio | G06F 11/2028 714/12 |

(Continued)

FOREIGN PATENT DOCUMENTS

| | | |
|---|---|---|
| CN | 1815908 | 8/2006 |
| CN | 102223250 | 3/2014 |

OTHER PUBLICATIONS

"Office Action of Taiwan Counterpart Application" with partial English translation, dated Apr. 1, 2016, p. 1-6.

(Continued)

*Primary Examiner* — Yolanda L Wilson
(74) *Attorney, Agent, or Firm* — JCIPRNET (57) ABSTRACT

A failover system and a method of deciding master-slave relationship therefor are provided. The failover system includes a first electronic device, a second electronic device, a decision circuit and at least two isolation modules. The decision circuit is coupled to the first electronic device and the second electronic device and configured to determine operating states of the first electronic device and the second electronic device and output a first selecting signal and a second selecting signal. The at least two isolation modules are coupled to the first electronic device, the second electronic device, and the decision circuit and configured to (Continued)

switch a master-slave relationship between the first electronic device and the second electronic device according to the first selecting signal and the second selecting signal.

16 Claims, 9 Drawing Sheets

(56) References Cited

U.S. PATENT DOCUMENTS

| | | | | |
|---|---|---|---|---|
| 2004/0193737 | A1* | 9/2004 | Huffman | G06F 3/0617 710/1 |
| 2005/0050392 | A1* | 3/2005 | Baba | G06F 11/2023 714/25 |
| 2009/0328027 | A1* | 12/2009 | Tsuchiya | G06F 8/65 717/171 |

OTHER PUBLICATIONS

"Office Action of China Counterpart Application," dated Feb. 16, 2017, with English translation thereof, p. 1-11.

\* cited by examiner

FAILOVER SYSTEM AND METHOD OF DECIDING MASTER-SLAVE RELATIONSHIP THEREFOR

CROSS-REFERENCE TO RELATED APPLICATION

This application claims the priority benefit of Taiwan application serial no. 103139206, filed on Nov. 12, 2014. The entirety of the above-mentioned patent application is hereby incorporated by reference herein and made a part of this specification.

BACKGROUND

Field of the Invention

The invention is directed to a failover system and more particularly, to a failover system and a method of deciding master-slave relationship therefor capable of switching a master-slave relationship by means of hardware.

Description of Related Art

In current server systems, for stable operation of a whole server system, part of apparatuses in the server system are even expected to provide uninterruptible services during the maintenance of the server system. In this circumstance, a user may usually consider to adopt a server system design with a failover architecture. However, how to decide which is the main device and which is the redundant device in the server system design with the failover architecture is not easy.

In the commonly adopted method, two or more electronic devices which are back up for each other can communicate with each other though signal connection (e.g. RS-232, I2C, LAN). Software/firmware in each electronic devices may decide which is the main device and which is the redundant device through mutual communication between each other, such that the main device can have a deciding authority over the whole server system. However, the software/firmware in one electronic device can learn whether the other electronic devices are normal only through the mutual communication. Therefore, in case a certain electronic device encounters a failure due to a certain reason, but still dominates the whole system, or the main device is damaged, but the backup electronic device cannot successfully communicate with, or the main device is damaged, the failover system will result in malfunction. Therefore, the completeness of the failover function in the server system can contribute to avoid the inconvenience in managing the server system.

SUMMARY

The invention provides a failover system and a method of deciding master-slave relationship therefor, which are capable of simplifying software/firmware structures in electronic devices which are backup for each other and have better expansibility.

According to an embodiment of the invention, a failover system including a first electronic device, a second electronic device, a decision circuit and at least two isolation modules is provided. The decision circuit is coupled to the first electronic device and the second electronic device and configured to determine an operating state of the first electronic device and an operating state of the second electronic device and output a first selecting signal and a second selecting signal. The at least two isolation modules are respectively coupled to the first electronic device, the second electronic device and the decision circuit and configured to a master-slave relationship between the first electronic device and the second electronic device according to the first selecting signal and the second selecting signal.

According to an embodiment of the invention, a method of deciding master-slave relationship for a failover system is provided. The method includes determining an operating state of the first electronic device and an operating state of the second electronic device and outputting a first selecting signal and a second selecting signal; and switching a master-slave relationship between the first electronic device and the second electronic device according to the first selecting signal and the second selecting signal.

To sum up, in the failover system and the method of deciding master-slave relationship therefor provided by the embodiments of the invention, the master-slave relationship is selected by using the physical decision circuit in the failover system, and the isolation modules are controlled according to the selecting signals output by the decision circuit, such that a scenario where the electronic devices which are backup for each other have two or more main devices simultaneously controlling the whole system will not occur. Moreover, the software/firmware structures in the electronic devices which are backup for each other can be simplified that it is not necessary to determine which one is the main device and which one is the redundant device, such that the invention is free from difficulty in system expansion as the devices which are backup for each other are increased. Therefore, the failover system and the method of deciding master-slave relationship therefor can have better expansibility in usage.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the exemplary embodiments of the disclosure, examples of which are illustrated in the accompanying drawings. Wherever possible, the same reference numbers for the elements/components/symbols in the drawings and the description are used to refer to the same or like part.

Figure 1:
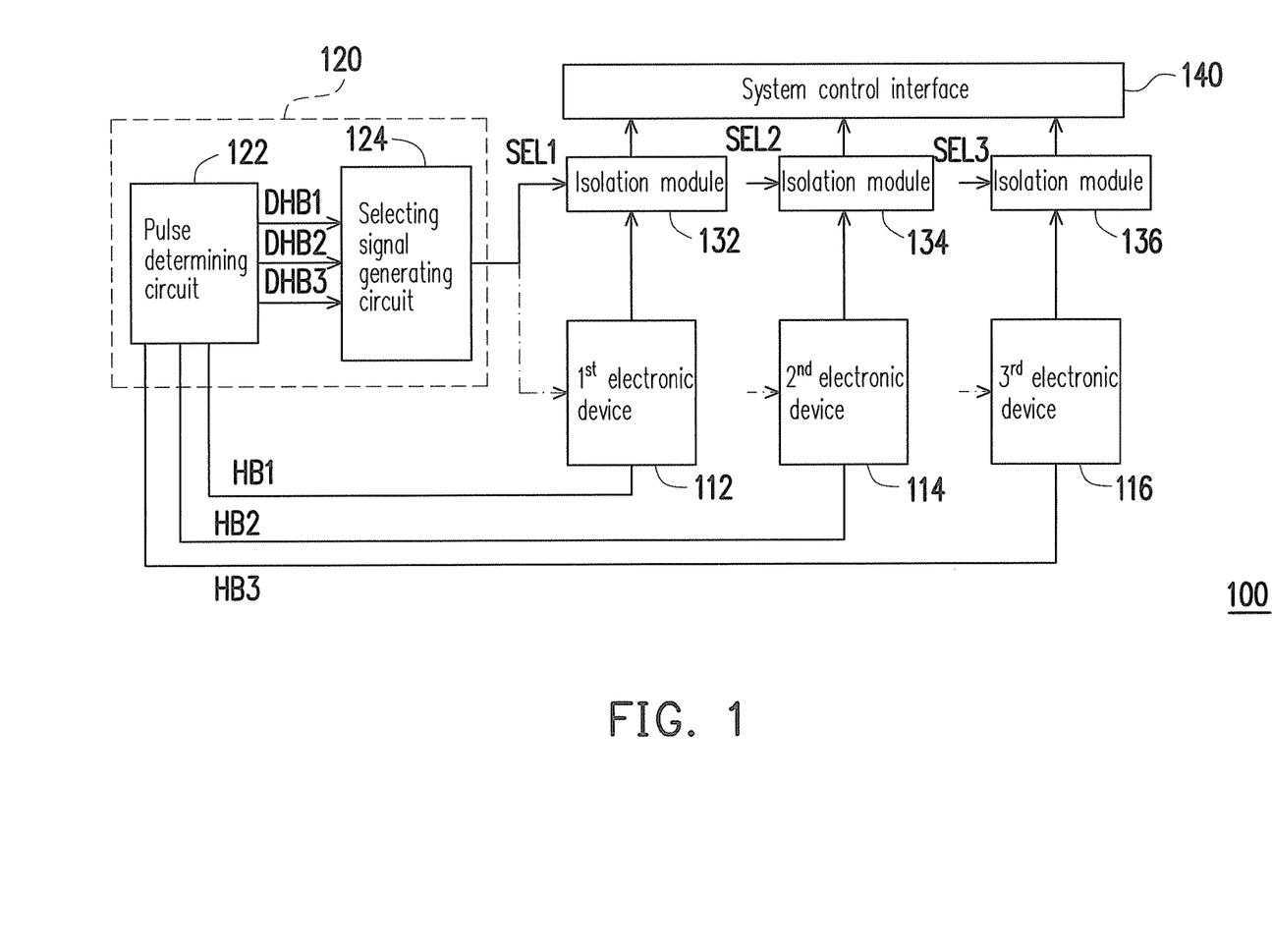
FIG. 1 is a block diagram illustrating a failover system according to an embodiment of the invention.

FIG. 1 is a block diagram illustrating a failover system 100 according to an embodiment of the invention. Referring to FIG. 1, the failover system 100 includes a first electronic device 112, a second electronic device 114, a third electronic device 116, a decision circuit 120, isolation modules 132, 134 and 136 and a system control interface 140. The first electronic device 112, the second electronic device 114 and the third electronic device 116 are respectively coupled to the corresponding isolation modules 132, 134 and 136. For example, the first electronic device 112 is coupled to the isolation module 132, the second electronic device 114 is coupled to the isolation module 134, and the third electronic device 116 is coupled to the isolation module 136. In other words, the isolation modules 132, 134 and 136 are coupled between the electronic devices 112, 114 and 116 and the system control interface 140. The system control interface 140 may be an interface for the electronic devices 112, 114 and 116 to communicate with one another by means of a serial advanced technology attachment (serial ATA) or a local area networking (LAN) technique, for example.

For clearness and simplicity, FIG. 1 only illustrates three electronic devices, i.e., 112, 114 and 116 and their corresponding isolation modules, i.e., 132, 134 and 136 for description; however, the numbers of the electronic devices and the isolation modules may vary with actual design/application demands, which are not limited in the invention. Additionally, it should be noted that the first electronic device 112, the second electronic device 114 and the third electronic device 116 are further coupled to the decision circuit 120, and the decision circuit 120 is coupled to the isolation modules 132, 134 and 136. The decision circuit 120 determines operating states of the first electronic device 112, the second electronic device 114 and the third electronic device 116 and outputs a first selecting signal SEL1, a second selecting signal SEL2 and a third selecting signal SEL3. The isolation modules 132, 134 and 136 are configured to switch a master-slave relationship among the first electronic device 112, the second electronic device 114 and the third electronic device 116 respectively according to the first selecting signal SEL1, the second selecting signal SEL2 and the third selecting signal SEL3. Hereinafter, the failover system 100 is mainly applied in a server system, for example, such as a server system formed by a plurality of blade servers, where the electronic devices 112, 114 and 116 are different blade servers. Persons who apply the present embodiment shall understand that the invention is not intent to limit the types of the electronic devices.

Continuously referring to FIG. 1, in the present embodiment, each of the electronic devices 112, 114 and 116 in the failover system 100 may output a pulse signal having a constant frequency (e.g., 1 Hz) to the decision circuit 120. This type of pulse signals may be commonly referred to as heartbeat signals (HBx). For example, the first electronic device 112 outputs a first pulse signal HB1, the second electronic device 114 outputs a second pulse signal HB2, and the third electronic device 116 outputs a third pulse signal HB3. The first pulse signal HB1, the second pulse signal HB2 and the third pulse signal HB3 are important indicators for determining whether each of the electronic devices 112, 114 and 116 is normal. More specifically, the electronic devices has to continuously output the pulse signals HBx, such that after performing a determination process on the pulse signals HBx, the decision circuit 120 may learn whether the electronic devices 112, 114 and 116 are normal. Accordingly, the decision circuit 120 outputs selecting signals SELn to the corresponding isolation modules 132, 134 and 136, so as to switch the master-slave relationship between each of the electronic devices 112, 114 and 116. In an embodiment, if each of the electronic devices 112, 114 and 116 has corresponding software/firmware and would like to learn whether each of the electronic devices 112, 114 and 116 has a main device, the decision circuit 120 may further return the selecting signal SELn to each of the electronic devices 112, 114 and 116 (as illustrated by a dashed line in FIG. 1), but the invention is not limited thereto.

In the present embodiment, each of the isolation modules 132, 134 and 136 is an element capable of isolating electrical signal and may be implemented as a mechanical or an electronic element. The mechanical element is only adaptive to be operated at a low-frequency transmission rate, which may be a reel relay or a solid state relay (SSR), for example. The electronic may be adaptive to be operated at most transmission rates and has lowest cost, which may be a transistor or a bi-directional buffer, for example, which is not limited in the present embodiment. In the present embodiment, each of the isolation modules 132, 134 and 136 may also be an optical isolating element capable of completely isolating signals without having issues related to frequencies in response and adaptive for a high-frequency or an ultra-high-frequency transmission rate, which may be, for example, an optical coupler (OC), an optical transistor or the like.

Figure 2:
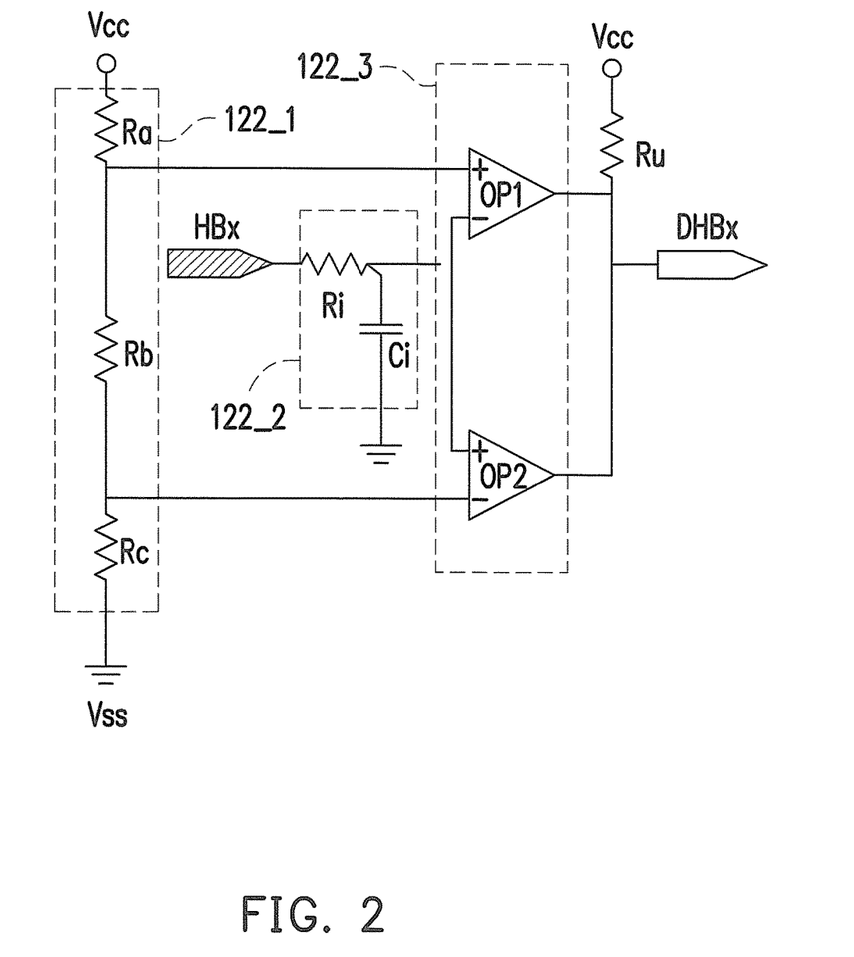
FIG. 2 is a schematic diagram illustrating the pulse determining circuit of FIG. 1 according to an embodiment of the invention.

FIG. 2 is a schematic diagram illustrating the pulse determining circuit of FIG. 1 according to an embodiment of the invention. Referring to FIG. 2, the pulse determining circuit 122 includes a reference voltage generator 122_1, an integrating circuit 122_2 and a voltage comparator 122_3 (i.e., voltage comparing circuit). Both the reference voltage generator 122_1 and the integrating circuit 122_2 are coupled to voltage comparator 122_3. The voltage comparator 122_3 may include two signal amplifiers OP1 and OP2. The voltage comparator 122_3 is configured to compare different voltage levels. The pulse signal HBx output by each of the electronic devices is determined by the pulse determining circuit 122 in the decision circuit 120, and the pulse determining circuit 122 outputs a determining signal DHBx to the selecting signal generating circuit 124.

In the present embodiment, the reference voltage generator 122_1 includes divider resistors Ra, Rb and Rc, and the divider resistors Ra, Rb and Rc are connected in serial with one another between a system voltage Vcc and a ground voltage Vss, in which a first reference voltage Vref1 is generated by the reference voltage generator 122_1 through a node between the divider resistors Ra and Rb, a second reference voltage Vref2 is generated through a node between the divider resistors Rb and Rc, and the first reference voltage Vref1 is greater than the second reference voltage Vref2. It should be noted that a value of each of the divider resistors Ra, Rb and Rc may be used to regulate a reference voltage range. In other words, the value of each of the divider resistors Ra, Rb and Rc may be used to decide an upper limit and a lower limit for each reference voltage compared by the voltage comparator 122_3 in the pulse determining circuit 122, such that whether a voltage level generated by the integrating circuit 1222 is reasonable may be determined.

Continuously referring to FIG. 2, the integrating circuit 122_2 includes a resistor Ri and a capacitor Ci. When a pulse signals HBx passes through the resistor Ri and the capacitor Ci, a voltage level is generated, and when the pulse signal HBx is in a normal stable state, the voltage level is a constant value (e.g., 3.3V). In the present embodiment, a value of a resistance of the resistor Ri and a value of a capacitance of the capacitor Ci are decided by a frequency and a voltage level required by the operation of the pulse signal HBx, but the invention is not limited thereto.

In more detail, the pulse determining circuit 122 may generate the first reference voltage Vref1 and the second reference voltage Vref2 by means of regulating the divider resistors Ra, Rb and Rc in the reference voltage generator 122_1. When the determining voltage level is higher than a level of the first reference voltage Vref1 or lower than a level of the second reference voltage Vref2, the voltage comparing circuit outputs a low-level determining signal DHBx. When the determining voltage level is lower than the first reference voltage Vref1 and higher than the second reference voltage Vref2, the voltage comparing circuit outputs a high-level determining signal DHBx.

For example, when the voltage level of the pulse signal HBx generated through the resistor Ri and the capacitor Ci in the integrating circuit 122_2 falls within an interval between the first reference voltage Vref1 and the second reference voltage Vref2 (e.g., from 3V to 3.5V), the pulse determining circuit 122 may output a high-level determining signal DHBx. When the voltage level of the pulse signal HBx generated through the resistor Ri and the capacitor Ci in the integrating circuit 122_2 falls out of the interval between first reference voltage Vref1 and the second reference voltage Vref2 (e.g., higher than 3V or lower than 3.5V), the pulse determining circuit 122 may output a low-level determining signal DHBx. Thus, when the determining signal DHBx has a high-level voltage, it indicates that the electronic device generating the pulse signal HBx may be operated normally, otherwise, that the electronic device generating the pulse signal HBx may not be operated normally.

Figure 3:
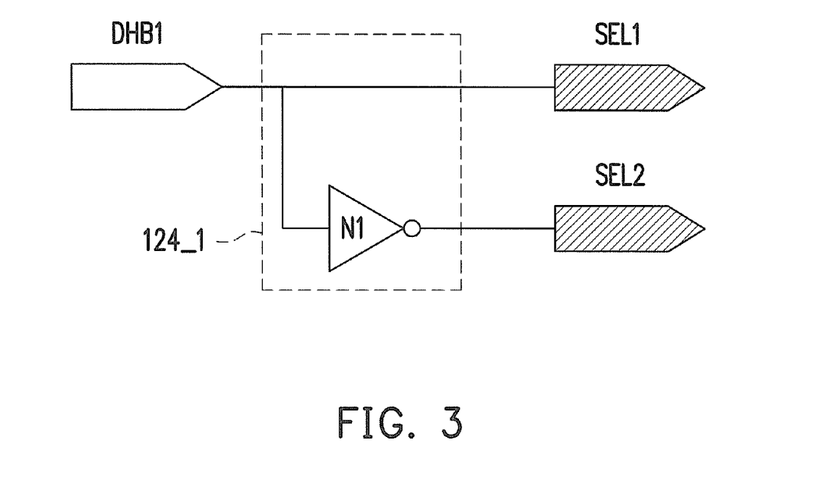
FIG. 3 is a schematic diagram illustrating the selecting signal generating circuit of FIG. 1 according to an embodiment of the invention.

FIG. 3 is a schematic diagram illustrating the selecting signal generating circuit of FIG. 1 according to an embodiment of the invention. In the present embodiment, when the number of the electronic devices being backup for each other in the failover system 100 is 2 (e.g., including the electronic devices 112 and 114), the circuit structure of the selecting signal generating circuit 124 includes a first logic operation circuit 124_1, as shown in FIG. 3. Therein, the first logic operation circuit 124_1 is a NOT gate N1. Specifically, when the determining signal DHBx is high-level and processed by the first logic operation circuit 124_1 in the selecting signal generating circuit 124, the first selecting signal SEL1 and the second selecting signal SEL2 may be output to the first electronic device 112 and the second electronic device 114. The first selecting signal SEL1 and the second selecting signal SEL2 are inverse to each other.

Figure 4:
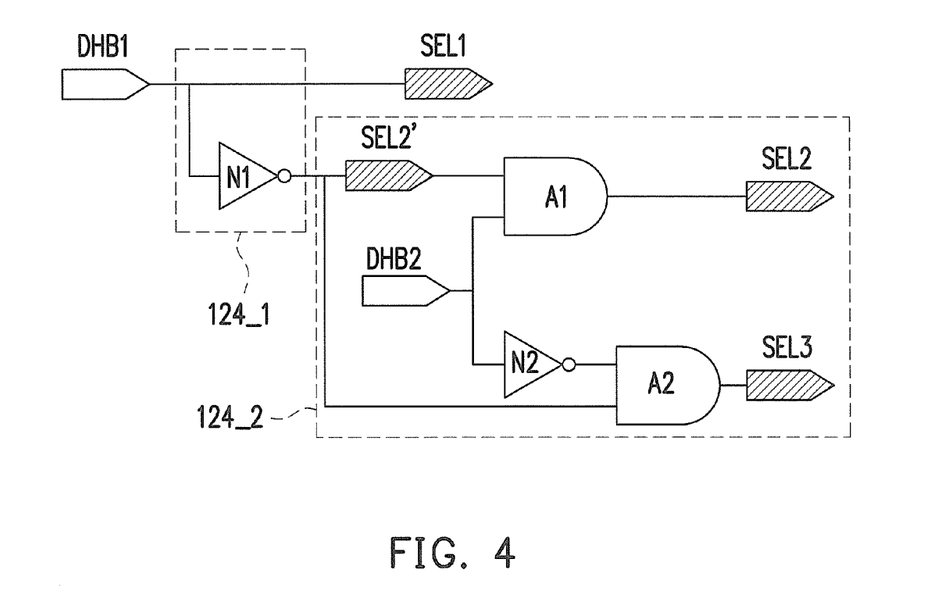
FIG. 4 is a schematic diagram illustrating the selecting signal generating circuit of FIG. 1 according to another embodiment of the invention.

FIG. 4 is a schematic diagram illustrating the selecting signal generating circuit of FIG. 1 according to another embodiment of the invention. The present embodiment in FIG. 4 is different from the embodiment illustrated in FIG. 3 in adding a second logic operation circuit 124_2 in the selecting signal generating circuit 124 if the number of the electronic devices in the failover system 100 which are backup for each other is 3 (e.g., including the electronic devices 112, 114 and 116) or more, as shown in FIG. 4. The second logic operation circuit 124_2 is connected in serial with an inverting output terminal of the first logic operation circuit 124_1, in which the first logic operation circuit 124_1 includes a NOT gate N1, and the second logic operation circuit 124_2 includes AND gates A1 and A2 and a NOT gate N2. In the present embodiment, the AND gate A1 is configured to receive a second determining signal DHB2 output by the pulse determining circuit 122 determining an operating state of the second electronic device 114 and an inverse output result SEL2' output from the first logic operation circuit 124_1 of the previous stage to perform the logic operation, so as to output the second selecting signal SEL2. Similarly, the AND gate A2 is configured to receive an output result of the second determining signal DHB2 output by the pulse determining circuit 122 determining the operating state of the second electronic device 114, and inverted by the NOT gate N2 and the inverse output result SEL2' output from the first logic operation circuit 124_1 of the previous stage to perform the logic operation, so as to obtain the third selecting signal SEL3.

Figure 5:
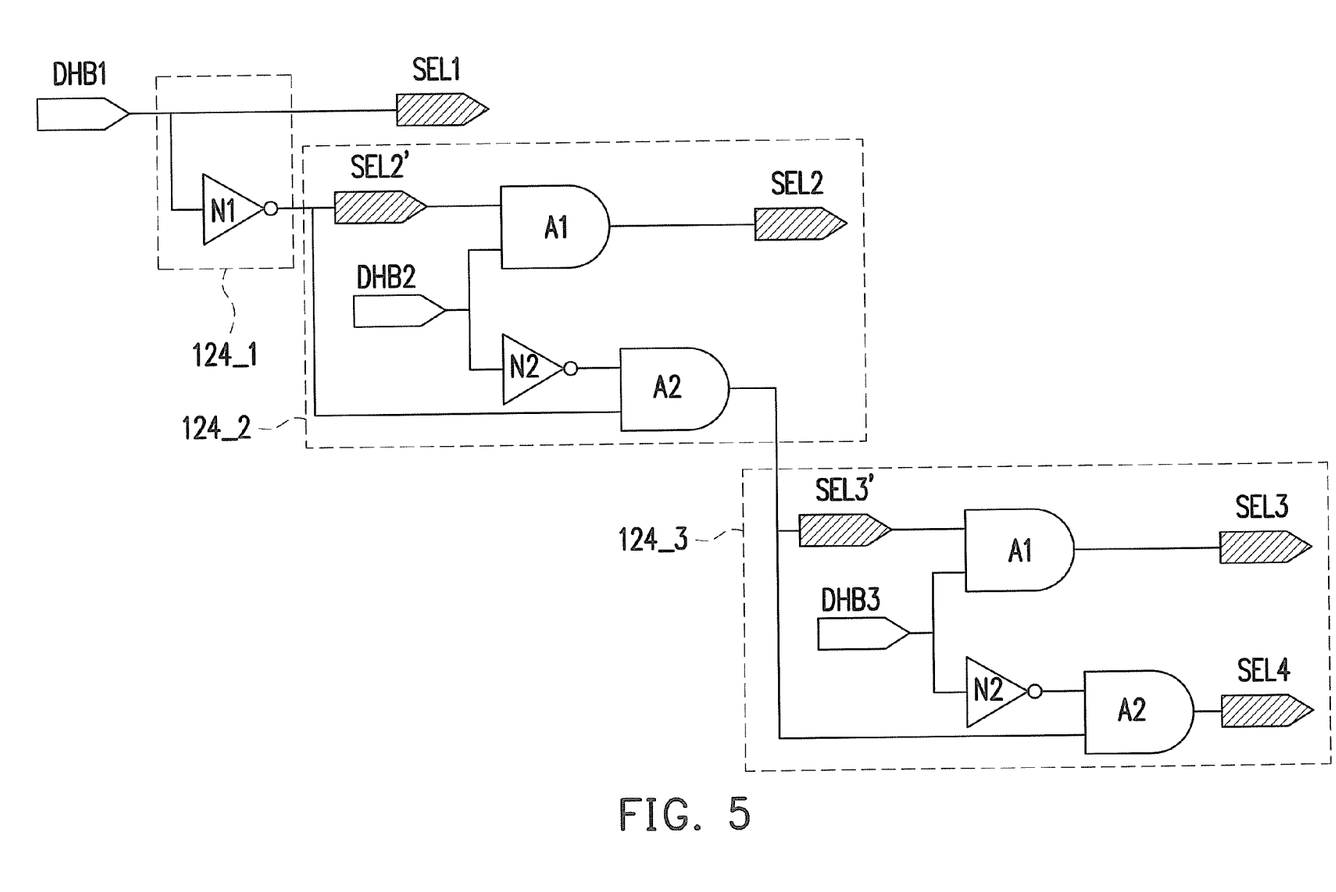
FIG. 5 is a schematic diagram illustrating the selecting signal generating circuit of FIG. 1 according to yet another embodiment of the invention.

FIG. 5 is a schematic diagram illustrating the selecting signal generating circuit of FIG. 1 according to yet another embodiment of the invention. The present embodiment is different from the embodiment illustrated in FIG. 3 in adding the number of the determining signals generated by the pulse determining circuit 122 (e.g., a third determining signal DHB3 is added) if the number of the electronic devices in the failover system 100 which are backup for each other is 4 or more, and the third logic operation circuits 124_3 correspondingly in the selecting signal generating circuit 124 are added, of which the technical content may be derived with reference to the description related to the embodiment illustrated in FIG. 4. According to the embodiments of the invention described above, when the number of the electronic devices in the failover system 100 is continuously increased, the failover system 100 can achieve an effect of expansion merely by means of continuously adding the circuits configured for generating the selecting signals SELn in a corresponding number.

Figure 6:
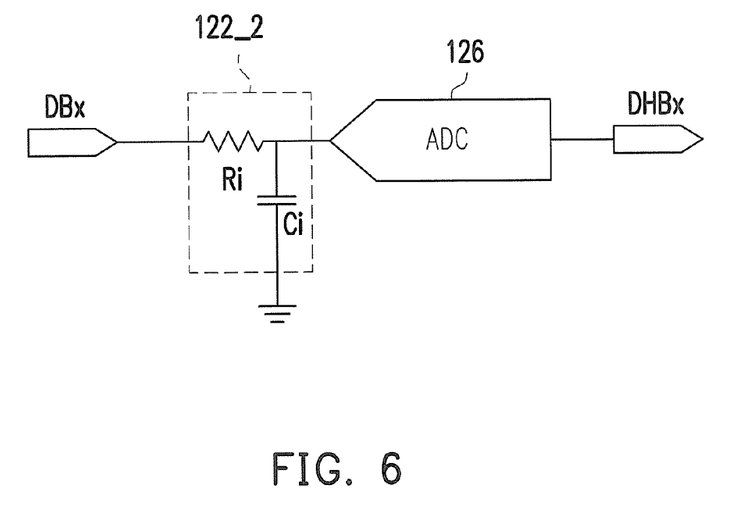
FIG. 6 is a schematic diagram illustrating the pulse determining circuit of FIG. 1 according to still another embodiment of the invention.

FIG. 6 is a schematic diagram illustrating the pulse determining circuit of FIG. 1 according to still another embodiment of the invention. In a scenario regardless of the circuit cost, a voltage comparator (e.g., the voltage comparator 122_3 illustrated in FIG. 2) may be replaced with a programmable analog-to-digital converter (ADC) 126, as shown in FIG. 5. In the present embodiment, the ADC 126 is commonly configured to regulate and control the overall operation of the ADC 126 through a control interface, such as I2C, CAN, SPI or the like. When a voltage signal processed by the resistor Ri and the capacitor Ci in the integrating circuit 122_2 meets or does not meet an internal set value of the ADC 126, the ADC 126 may output a corresponding determining signal DHBx.

It should be noted that the failover system 100 of the invention may also be implemented with the use of an integrated circuit, such as a programmable logic device (PLD), a complex programmable logic device (CPLD), a field-programmable gate array (FPGA) or the like, which construes no limitations to the invention. When such type of device is utilized, it is not necessary to convert each pulse signal HBx into a voltage to determine whether the electronic devices (e.g., the electronic devices 112, 114 and 116) generating the pulse signals HBx are normal devices through comparing the voltage levels thereof since the device has powerful function.

Figure 7:
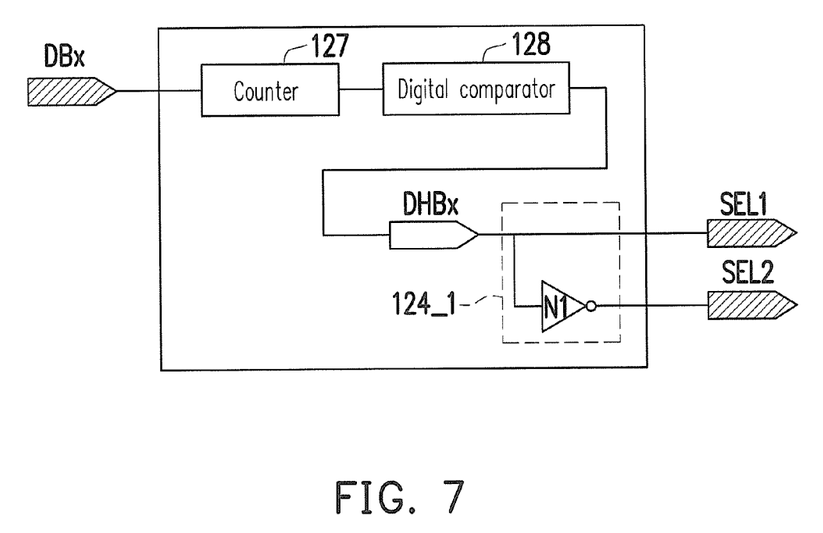
FIG. 7 is a schematic diagram illustrating the decision circuit of FIG. 1 according to an embodiment of the invention.

FIG. 7 is a schematic diagram illustrating the decision circuit of FIG. 1 according to an embodiment of the invention. In the present embodiment, a counter 127, a digital comparator 128 and the first logic operation circuit 124_1 may be configured in the decision circuit 120 to test whether each of the pulse signals HB1, HB2 and HB3 respectively output by each of the electronic devices 112, 114 and 116 falls within an appropriate frequency range. To be more specific, the counter 127 in the decision circuit 120 is configured to count within a predetermined time period how many pulse signals are received to obtain a counting result. Then, the counting result is sent to the digital comparator 128 for being compared with a predetermined value to generate a result which is greater than, smaller than or equal to each pulse signal.

For example, in case the electronic devices has to generate the pulse signals HBx of 1 Hz for outputting, the counter 127 may be set to count how many signals has to be received within the predetermined time period (e.g., 10 seconds). If it is assumed that a device has to generate 10 signals within the predetermined time period to be determined as normal, the predetermined value of the digital comparator 128 is set to be 10, and whether a count of the pulse signals HBx meets the predetermined value is determined during the counting process of the counter 127. If yes, a high-level determining signal DHBx is output. Then, the selecting signal generating circuit 124 is configured in the decision circuit 120 to perform the logic operation and output the selecting signals SELn.

A method of deciding master-slave relationship for the failover system 100 provided by the embodiments of the invention will be described below. For clearer description, the method of deciding master-slave relationship for the failover system 100 of the invention will be described with reference to each element of the failover system 100 illustrated in FIG. 1.

Figure 8:
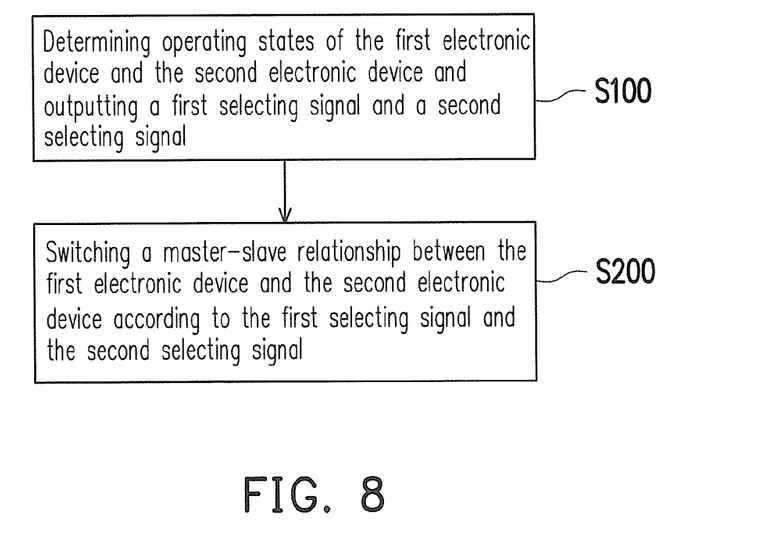
FIG. 8 is a flowchart illustrating a method of deciding master-slave relationship according to an embodiment of the invention.

FIG. 8 is a flowchart illustrating a method of deciding master-slave relationship according to an embodiment of the invention. Referring to both FIG. 1 and FIG. 8, first, the decision circuit 120 determines operating states of the first electronic device 112 and the second electronic device 114 and outputs the first selecting signal SEL1 and the second selecting signal SEL2 (step S100). Then, the isolation modules 132 and 134 switch the master-slave relationship between the first electronic device 112 and the second electronic device 114 according to the first selecting signal SEL1 and the second selecting signal SEL2 (step S200).

Figure 9:
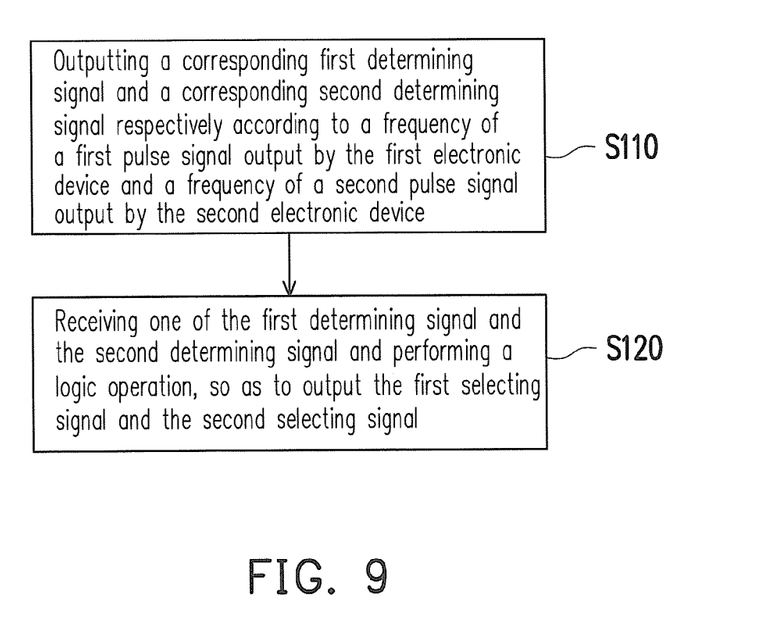
FIG. 9 is a flowchart illustrating step S100 of FIG. 8 according to an embodiment of the invention.

FIG. 9 is a flowchart illustrating step S100 of FIG. 8 according to an embodiment of the invention. Referring to FIG. 1, FIG. 8 and FIG. 9 simultaneously, first, the pulse determining circuit 122 outputs a corresponding first determining signal DHB1 and a corresponding second determining signal DHB2 respectively according to the first pulse signal HB1 output by the first electronic device 112 and the second pulse signal HB2 output by the second electronic device 114 (step S110). Then, the selecting signal generating circuit 134 receives one of the first determining signal DHB1 and the second determining signal DHB2 to perform the logic operation, so as to output the first selecting signal SEL1 and the second selecting signal SEL2 (step S120).

Figure 10:
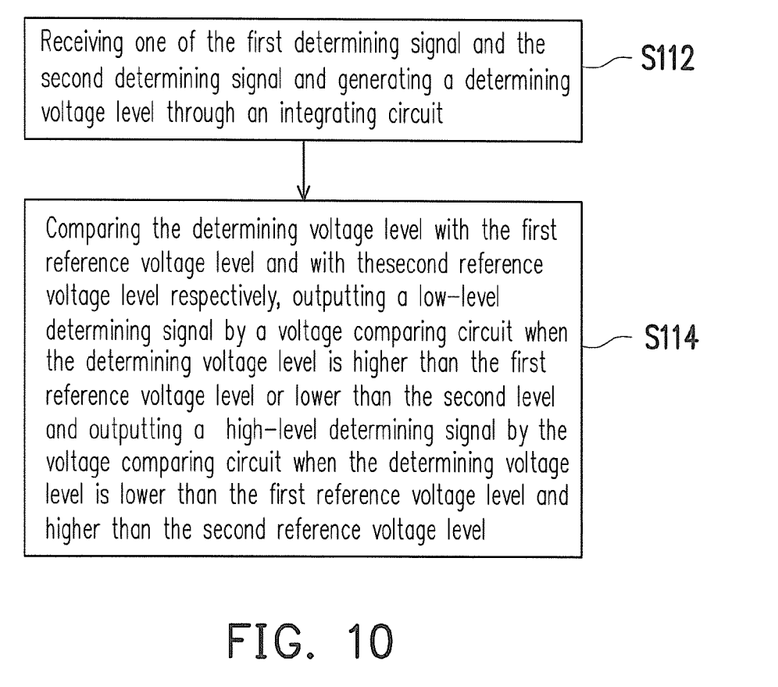
FIG. 10 is a flowchart illustrating step S110 of FIG. 9 according to an embodiment of the invention.

FIG. 10 is a flowchart illustrating step S110 of FIG. 9 according to an embodiment of the invention. Referring to FIG. 1, FIG. 9 and FIG. 10 simultaneously, first, the selecting signal generating circuit 124 receives one of the first determining signal DHB1 and the second determining signal DHB2 and generates a determining voltage level through the integrating circuit 122_2 (step S112). The voltage comparator of the voltage comparator 122 compares the determining voltage level with the first reference voltage level Vref1 and with the second reference voltage level Vref2, respectively. When the determining voltage level is higher than the first reference voltage level Vref1 or lower than the second reference voltage level Vref2, the voltage comparing circuit 122_3 outputs a low-level determining signal, and when the determining voltage level is lower than the first reference voltage level Vref1 and higher than the second reference voltage level Vref2, the voltage comparing circuit 122_3 outputs a high-level determining signal (step S114).

Figure 11:
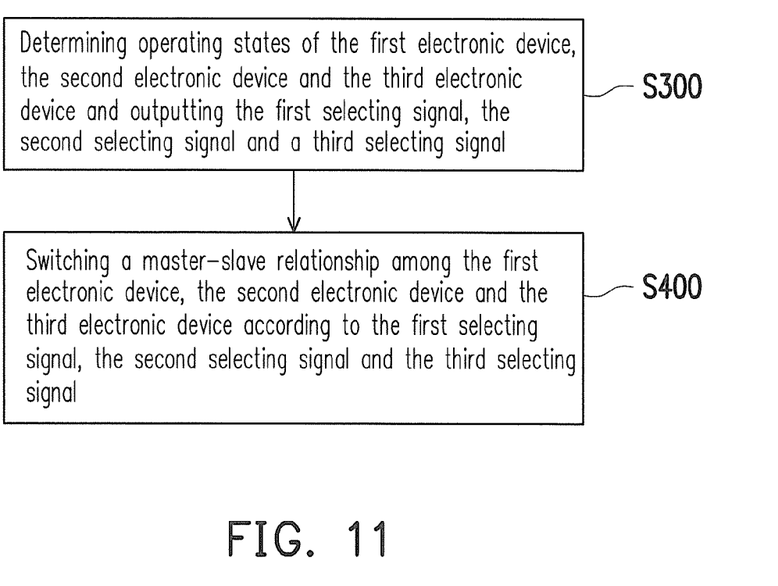
FIG. 11 is a flowchart illustrating a method of deciding master-slave relationship according to another embodiment of the invention.

FIG. 11 is a flowchart illustrating a method of deciding master-slave relationship according to another embodiment of the invention. The embodiment illustrated in FIG. 11 is different from the embodiment illustrated in FIG. 8 in the failover system 100 further including a third electronic device 116. Namely, in the case that the electronic devices is 3 in total, the decision circuit 120 determines the operating states of the first electronic device 112, the second electronic device 114 and the third electronic device 116 and outputs the first selecting signal SEL1, the second selecting signal SEL2 and the third selecting signal SEL3 (step S300). Then, the isolation modules 132, 134 and 136 switch the master-slave relationship among the first electronic device 112, the second electronic device 114 and the third electronic device 116 according to the first selecting signal SEL1, the second selecting signal SEL2 and the third selecting signal SEL3 (step S400). Steps S300 and S400 illustrated in FIG. 11 may be derived with reference to the description related to steps S100 and S200 illustrated in FIG. 8.

Figure 12:
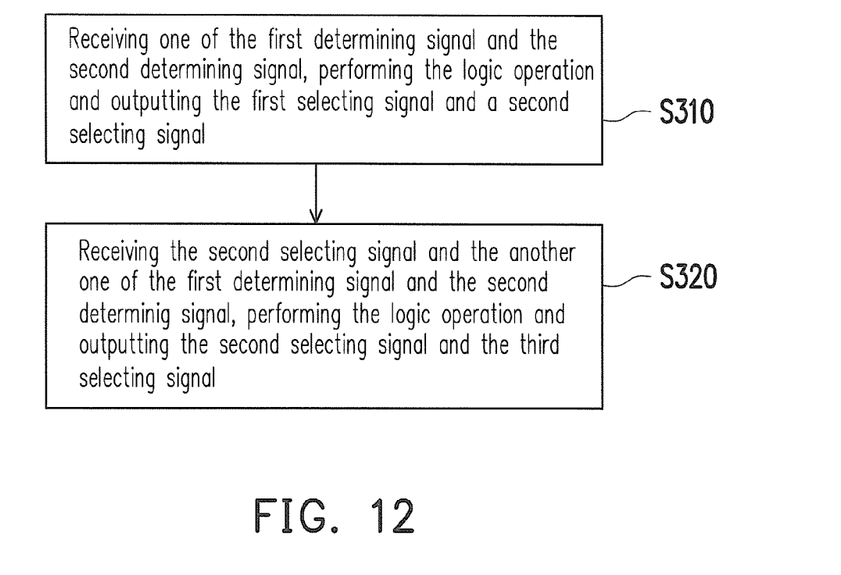
FIG. 12 is a flowchart illustrating step S300 of FIG. 11 according to an embodiment of the invention.

FIG. 12 is a flowchart illustrating step S300 of FIG. 11 according to an embodiment of the invention. Referring to FIG. 1, FIG. 11 and FIG. 12 simultaneously, first, the first logic operation circuit 124_1 receives one of the first determining signal DHB1 and the second determining signal DHB2 to perform the logic operation, so as to output the first selecting signal SEL1 and the second selecting signal SEL2 (step S310), wherein the first selecting signal SEL1 and the second selecting signal SEL2 are inverse to each other. Then, the second logic operation circuit 124_2 receives the second selecting signal SEL2 and the another one of the first determining signal DHB1 and the second determining signal DHB2 to perform the logic operation and outputs the second selecting signal SEL2 and the third selecting signal SEL3 (step S320). Steps S310 and S420 illustrated in FIG. 12 may be derived with reference to the description related to steps step S110 and S120 illustrated in FIG. 9.

Figure 13:
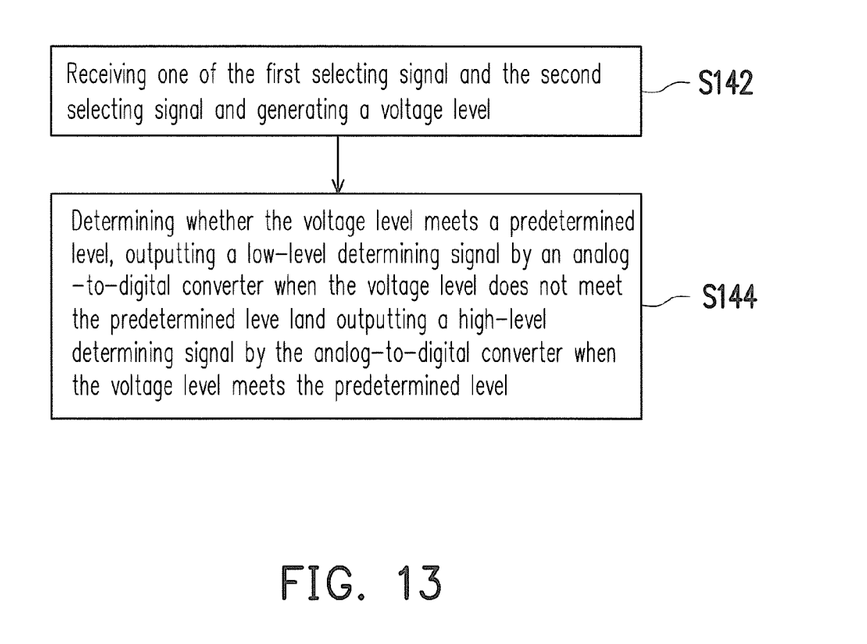
FIG. 13 is a flowchart illustrating step S100 of FIG. 8 according to another embodiment of the invention.

FIG. 13 is a flowchart illustrating step S100 of FIG. 8 according to another embodiment of the invention. Referring to FIG. 1, FIG. 2, FIG. 8 and FIG. 13 simultaneously, first, the integrating circuit 122_2 of FIG. 2 receives one of the first pulse signal HB1 and the second pulse signal HB2 and generates a voltage level (step S142). Then, the analog-to-digital converter 126 determines whether the voltage level meets a predetermined level. When the voltage level does not meet the predetermined level, the analog-to-digital converter 126 outputs a low-level determining signal, and when the voltage level meets the predetermined level, the analog-to-digital converter 126 outputs a high-level determining signal (step S144).

Figure 14:
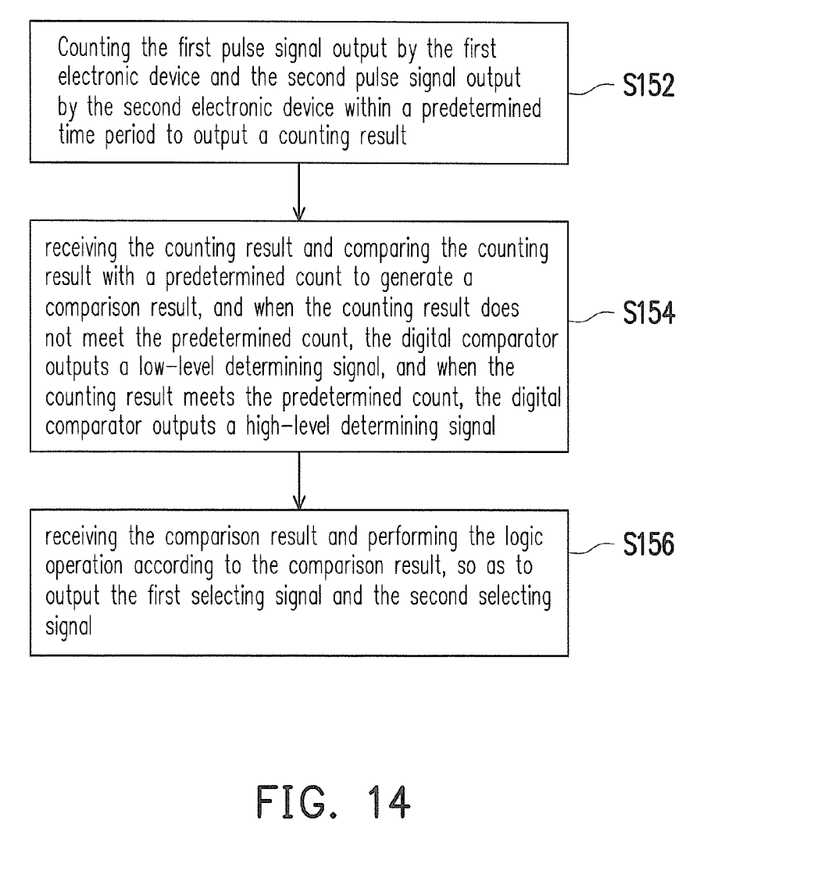
FIG. 14 is a flowchart illustrating step S110 of FIG. 9 according to yet another embodiment of the invention.

FIG. 14 is a flowchart illustrating step S110 of FIG. 9 according to yet another embodiment of the invention. Referring to FIG. 1, FIG. 9 and FIG. 14 simultaneously, first, the counter 127 counts the first pulse signal HB1 output by the first electronic device 112 and the second pulse signal HB2 output by the second electronic device 114 within a predetermined time period to output a counting result (step S152). Then, the digital comparator 128 receives the counting result and compares the counting result with a predetermined count to generate a comparison result. When the counting result does not meet the predetermined count, the digital comparator 128 outputs a low-level determining signal, and when the counting result meets the predetermined count, the digital comparator 128 outputs a high-level determining signal (step S154). At last, the first logic operation circuit 124_1 receives the comparison result and performs the logic operation according to the comparison result, so as to output the first selecting signal SEL1 and the second selecting signal SEL2 (step S156).

In light of the foregoing, the invention provides a failover system and a method of deciding master-slave relationship therefor utilizing the physical decision circuit to decide the master-slave relationship, and the selecting signals output by the decision circuit to decide the devices for being isolated. Thereby, the situation that two or more mast devices simultaneously decide the whole system does not occur in the devices which are backup for each other. Meanwhile, the software/firmware structures in the devices which are backup for each other can be much simplified, without determining which one is the main device and which one is the redundant device on the software/firmware. Moreover, the invention is free from difficulty in system expansion as the devices which are backup for each other are increased and thus, has better expansibility in usage and operation.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A failover system, comprising:
   a first electronic device;
   a second electronic device;
   a decision circuit, coupled to the first electronic device and the second electronic device and configured to determine an operating state of the first electronic device and an operating state of the second electronic device and output a first selecting signal and a second selecting signal; and
   at least two isolation modules, respectively coupled to the first electronic device, the second electronic device and the decision circuit and switching a master-slave relationship between the first electronic device and the second electronic device according to the first selecting signal and the second selecting signal,
   wherein the decision circuit comprises:
   a pulse determining circuit, configured to output a corresponding first determining signal and a corresponding second determining signal respectively according to a frequency of a first pulse signal output by the first electronic device and a frequency of a second pulse signal output by the second electronic device; and
   a selecting signal generating circuit, coupled to the pulse determining circuit and configured to receive one of the first determining signal and the second determining signal and perform a logic operation, to output the first selecting signal and an inverse of the first selecting signal and generate the second selecting signal according to the inverse of the first selecting signal, so as to output the first selecting signal and the second selecting signal.

2. The failover system according to claim 1, wherein the pulse determining circuit comprises:
   a reference voltage generator, configured to generate a first reference voltage level and a second reference voltage level, wherein the first reference voltage level is higher than the second reference voltage level;
   an integrating circuit, configured to receive one of the first pulse signal and the second pulse signal and generate a determining voltage level; and
   a voltage comparing circuit, coupled to the reference voltage generator and the integrating circuit, and configured to compare the determining voltage level with the first reference voltage level and with the second reference voltage level respectively,
   wherein the voltage comparing circuit outputs a low-level determining signal when the determining voltage level is higher than the first reference voltage level or lower than the second reference voltage level and outputs a high-level determining signal when the determining voltage level is lower than the first reference voltage level and higher than the second reference voltage level.

3. The failover system according to claim 1, wherein the selecting signal generating circuit comprises:
   a first logic operation circuit, configured to receive one of the first determining signal and the second determining signal and perform the logic operation according to a level of the one of the first determining signal and the second determining signal, so as to output the first selecting signal and the second selecting signal.

4. The failover system according to claim 1, further comprising:
   a third electronic device, coupled to the decision circuit and the at least two isolation modules,
   wherein the decision circuit determines the operating state of the first electronic device, the operating state of the second electronic device and an operating state of the third electronic device, outputs the first selecting signal, the second selecting signal and a third selecting signal, and the isolation modules respectively switch a master-slave relationship among the first electronic device, the second electronic device and the third electronic device according to the first selecting signal, the second selecting signal and the third selecting signal.

5. The failover system according to claim 1, wherein the selecting signal generating circuit comprises:
   a first logic operation circuit, configured to receive one of the first determining signal and the second determining signal and perform the logic operation, so as to output the first selecting signal and the inverse of the first selecting signal; and
   a second logic operation circuit, coupled to the first logic operation circuit and configured to receive the inverse of the first selecting signal and an another one of the first pulse signal and the second pulse signal and perform the logic operation, so as to output the second selecting signal and the third selecting signal.

6. The failover system according to claim 1, wherein the pulse determining circuit comprises:
an integrating circuit, configured to receive one of the first selecting signal and the second selecting signal and generate a voltage level; and
an analog-to-digital converter, coupled to the integrating circuit and configured to determine whether the voltage level meets a predetermined level,
wherein the analog-to-digital converter outputs a low-level determining signal when the voltage level does not meet the predetermined level and outputs a high-level determining signal when the voltage level meets the predetermined level.

7. The failover system according to claim 1, wherein the decision circuit comprises:
a counter, configured to count the first pulse signal output by the first electronic device and the second pulse signal output by the second electronic device within a predetermined time period and output a counting result;
a digital comparator, coupled to the counter and configured to receive the counting result and compare the counting result with a predetermined count, so as to generate a comparison result,
wherein the digital comparator outputs a low-level determining signal when the counting result does not meet the predetermined count and outputs a high-level determining signal when the counting result meets the predetermined count; and
a selecting signal generating circuit, coupled to the digital comparator and configured to receive the comparison result and perform the logic operation according to a level of the comparison result, so as to output the first selecting signal and the second selecting signal.

8. The fail over system according to claim 1, wherein the at least two isolation modules comprises a first isolation module and a second isolation module, wherein the first isolation module receives the first selecting signal and the second isolation module receives the second selecting signal, the first isolation module switches the master-slave relationship according to the received first selection signal, and the second isolation module switches the master-slave relationship according to the received second selection signal.

9. A method of deciding master-slave relationship for a failover system, the method comprising:
determining an operating state of a first electronic device and an operating state of a second electronic device and outputting a first selecting signal and a second selecting signal; and
switching at least two isolation modules corresponding to the first electronic device and the second electronic device according to the first selecting signal and the second selecting signal, to switch a master-slave relationship between the first electronic device and the second electronic device,
wherein the at least two isolation modules switch a master-slave relationship between the first electronic device and the second electronic device according to the first selecting signal and the second selecting signal respectively,
wherein the step of determining the operating state of the first electronic device and the operating state of the second electronic device comprises:
outputting a corresponding first determining signal and a corresponding second determining signal respectively according to a frequency of a first pulse signal output by the first electronic device and a frequency of a second pulse signal output by the second electronic device; and
receiving one of the first determining signal and the second determining signal and performing a logic operation, to output the first selecting signal and an inverse of the first selecting signal and generate the second selecting signal according to the inverse of the first selecting signal, so as to output the first selecting signal and the second selecting signal.

10. The method according to claim 9, wherein the step of outputting the corresponding first determining signal and the corresponding second determining signal respectively according to the frequency of a first pulse signal output by the first electronic device and the frequency of a second pulse signal output by the second electronic device comprises:
receiving one of the first determining signal and the second determining signal and generating a determining voltage level through an integrating circuit; and
comparing the determining voltage level with the first reference voltage level and with the second reference voltage level respectively, outputting a low-level determining signal when the determining voltage level is higher than the first reference voltage level or lower than the second reference voltage level and outputting a high-level determining signal when the determining voltage level is lower than the first reference voltage level and higher than the second reference voltage level.

11. The method according to claim 9, wherein the step of receiving the one of the first determining signal and the second determining signal and performing the logic operation, so as to output the first selecting signal and the second selecting signal comprises:
receiving one of the first determining signal and the second determining signal and performing the logic operation according to a level of the one of the first determining signal and the second determining signal, so as to output the first selecting signal and the second selecting signal.

12. The method according to claim 9, further comprising:
determining the operating state of the first electronic device, the operating state of the second electronic device and an operating state of the third electronic device and outputting the first selecting signal, the second selecting signal and a third selecting signal; and
switching a master-slave relationship among the first electronic device, the second electronic device and the third electronic device according to the first selecting signal, the second selecting signal and the third selecting signal.

13. The method according to claim 12, wherein the step of determining the operating state of the first electronic device, the operating state of the second electronic device and the operating state of the third electronic device and outputting the first selecting signal, the second selecting signal and the third selecting signal comprises:
receiving one of the first determining signal and the second determining signal and performing the logic operation, so as to output the first selecting signal and the inverse of the first selecting signal; and
receiving the inverse of the first selecting signal and a third determining signal, performing the logic operation and outputting the second selecting signal and the third selecting signal.

14. The method according to claim 9, wherein the step of determining the operating state of the first electronic device and the operating state of the second electronic device comprises:

receiving one of the first selecting signal and the second selecting signal and generating a voltage level; and determining whether the voltage level meets a predetermined level, outputting a low-level determining signal by an analog-to-digital converter when the voltage level does not meet the predetermined level and outputting a high-level determining signal by the analog-to-digital converter when the voltage level meets the predetermined level.

15. The method according to claim 9, wherein the step of determining the operating state of the first electronic device and the operating state of the second electronic device and outputting the first selecting signal and the second selecting signal comprises:

counting the first pulse signal output by the first electronic device and the second pulse signal output by the second electronic device within a predetermined time period and outputting a counting result;

receiving the counting result and comparing the counting result with a predetermined count to generate a comparison result, outputting a low-level determining signal by a digital comparator when the counting result does not meet the predetermined count and outputting a high-level determining signal when the counting result meets the predetermined count; and receiving the comparison result and performing the logic operation according to a level of the comparison result, so as to output the first selecting signal and the second selecting signal.

16. The method according to claim 9, wherein the at least two isolation module comprise a first isolation module and a second isolation module, the first isolation module receives the first selecting signal and the second isolation module receives the second selecting signal, wherein the first isolation module switches the master-slave relationship according to the received first selection signal, and the second isolation module switches the master-slave relationship according to the received second selection signal.

\* \* \* \* \*